C. H. RUSSELL.
CARTON FORMING MACHINE.
APPLICATION FILED APR. 12, 1915.

1,275,759.

Patented Aug. 13, 1918.
9 SHEETS—SHEET 1.

WITNESSES:

INVENTOR.
Clarence H. Russell,
BY
Parsons & Bodell.
ATTORNEYS.

C. H. RUSSELL.
CARTON FORMING MACHINE.
APPLICATION FILED APR. 12, 1915.

1,275,759.

Patented Aug. 13, 1918.
9 SHEETS—SHEET 2.

WITNESSES:

INVENTOR.
Clarence H. Russell,
BY
ATTORNEYS.

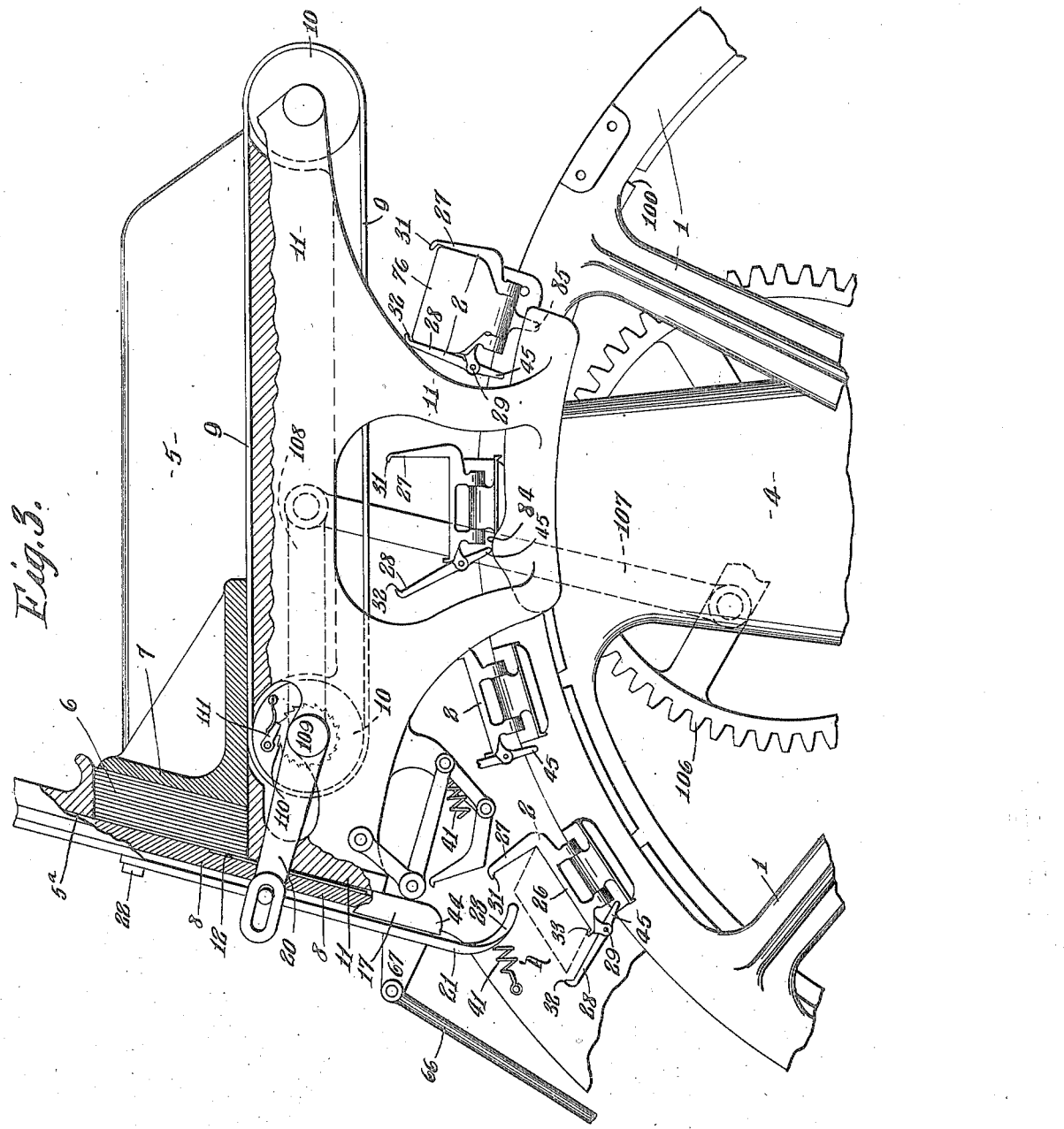

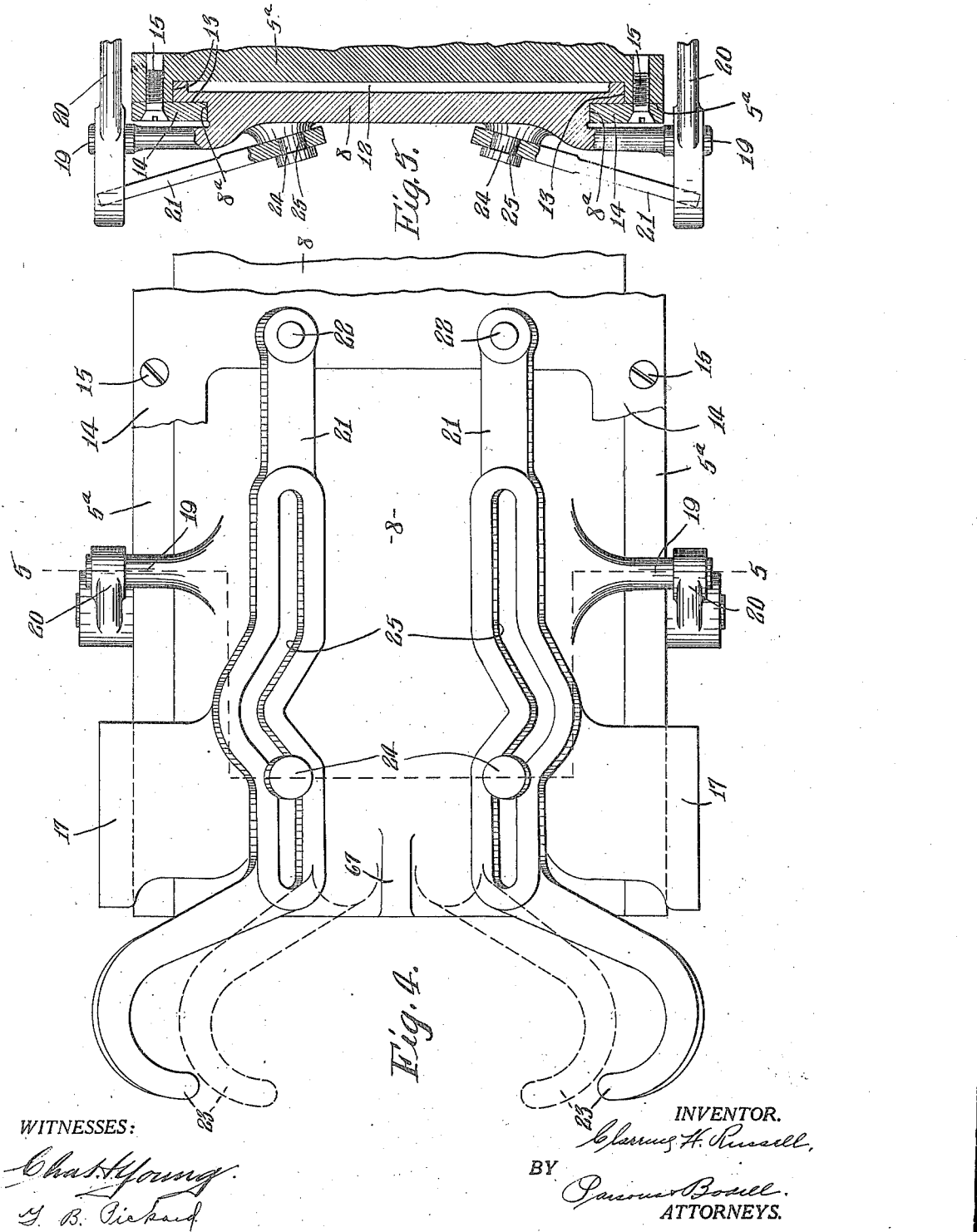

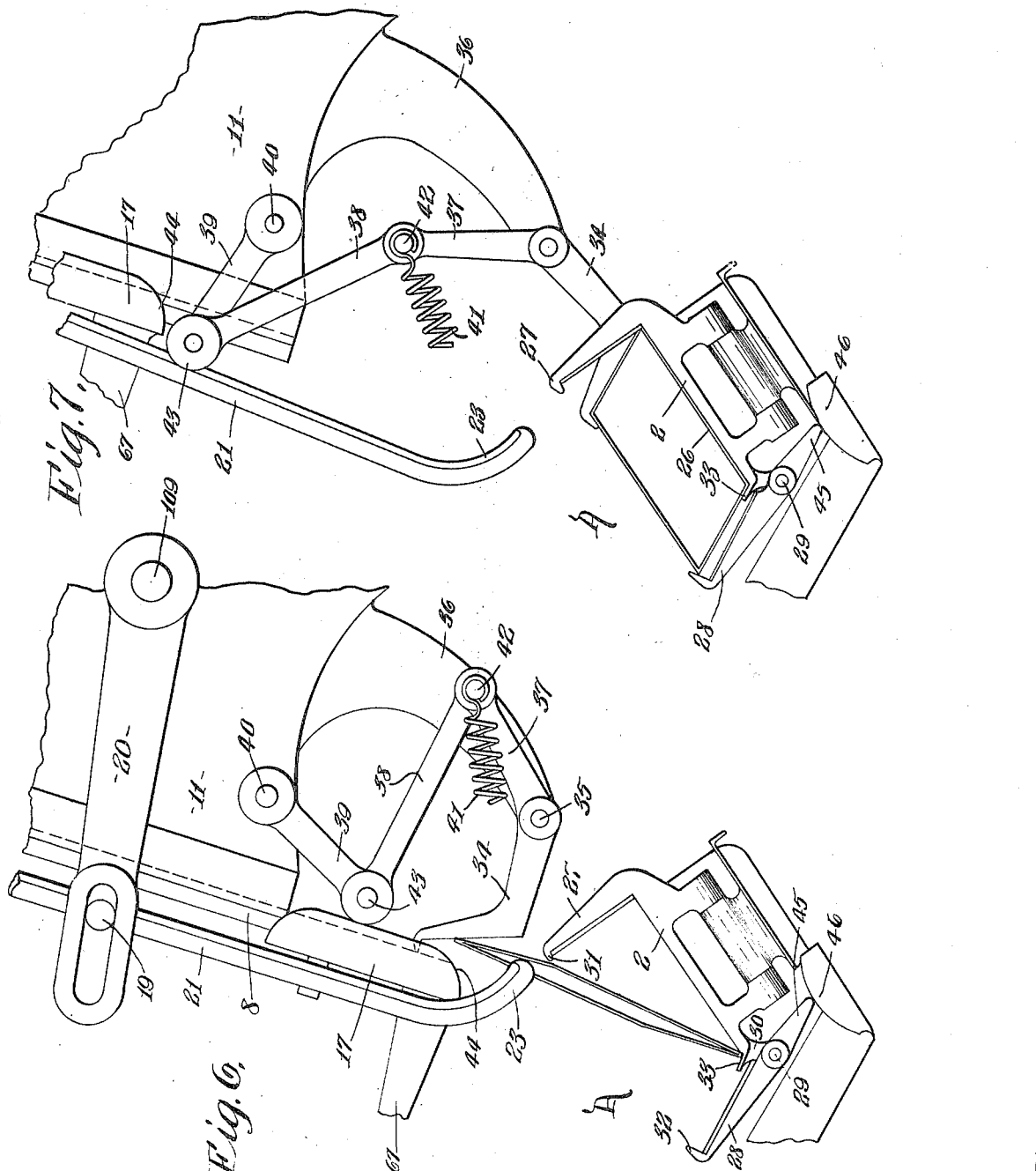

C. H. RUSSELL.
CARTON FORMING MACHINE.
APPLICATION FILED APR. 12, 1915.
1,275,759.
Patented Aug. 13, 1918.
9 SHEETS—SHEET 6.
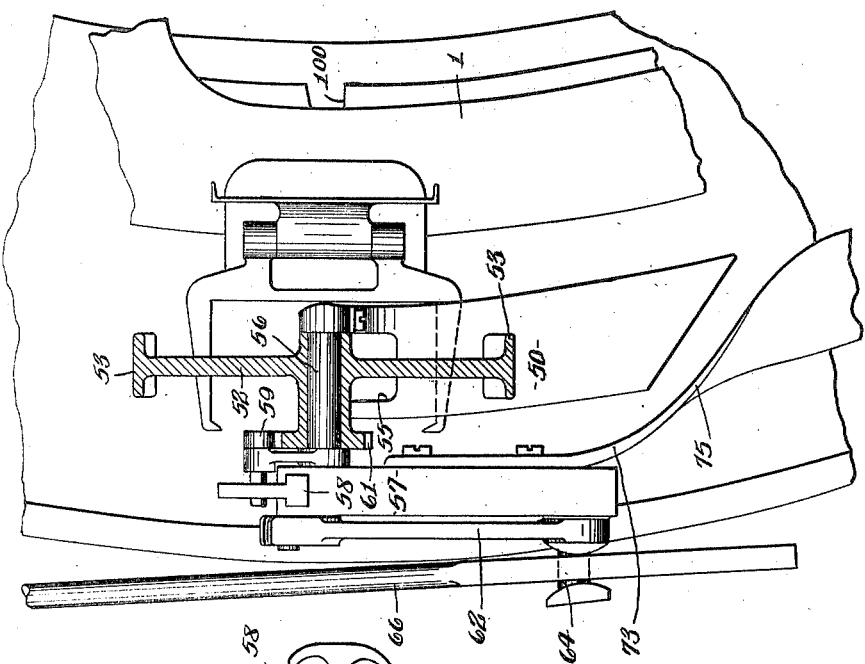
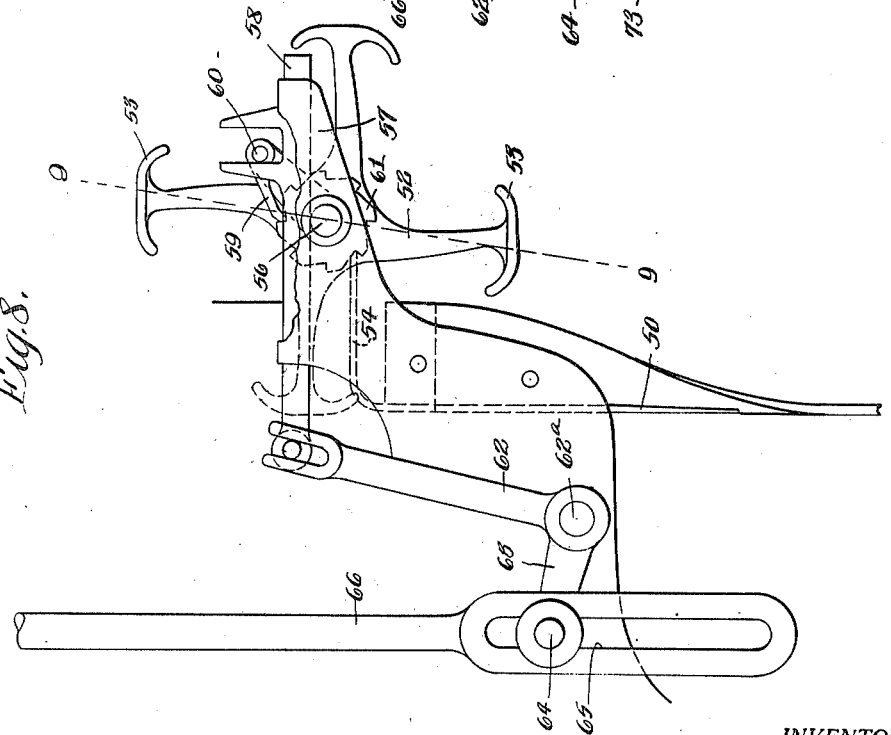
WITNESSES:
INVENTOR.
BY
ATTORNEYS.

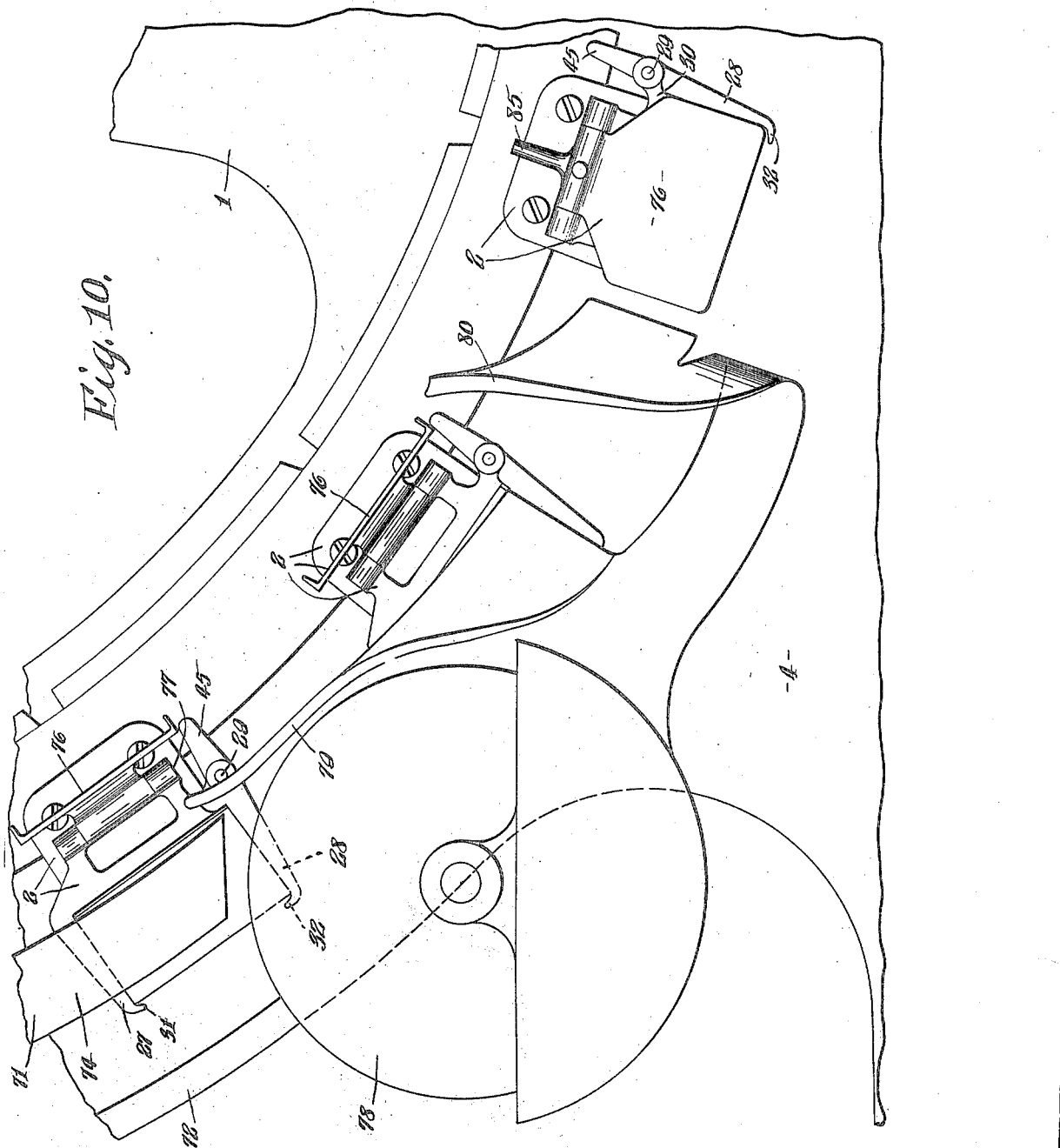

C. H. RUSSELL.
CARTON FORMING MACHINE.
APPLICATION FILED APR. 12, 1915.
1,275,759.
Patented Aug. 13, 1918.
9 SHEETS—SHEET 8.
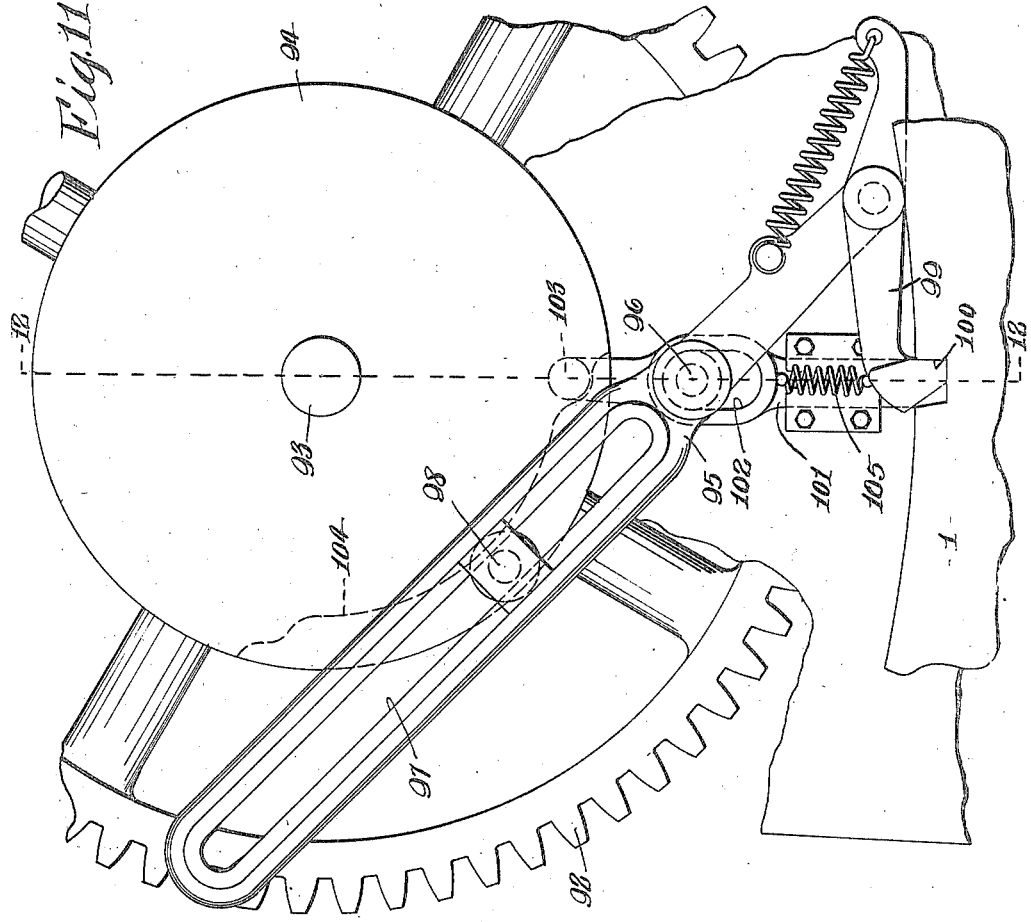
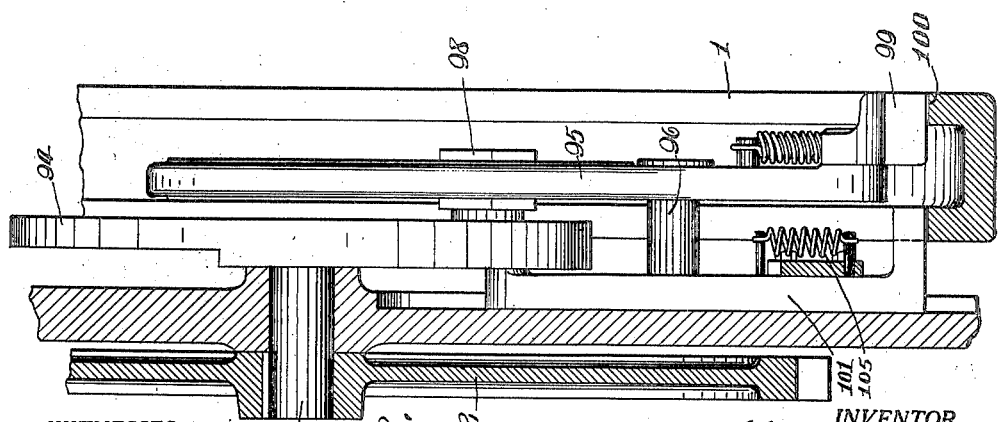
WITNESSES:
Chas H Young
M. B. Pickard
INVENTOR.
Clarence H. Russell
BY
Parsons Bodell
ATTORNEYS.

C. H. RUSSELL.
CARTON FORMING MACHINE.
APPLICATION FILED APR. 12, 1915.
1,275,759.
Patented Aug. 13, 1918.
9 SHEETS—SHEET 9.
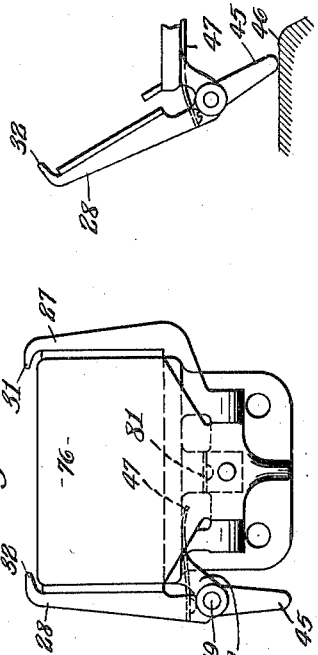
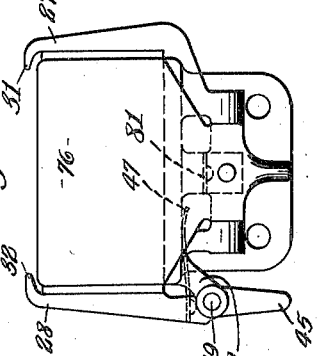
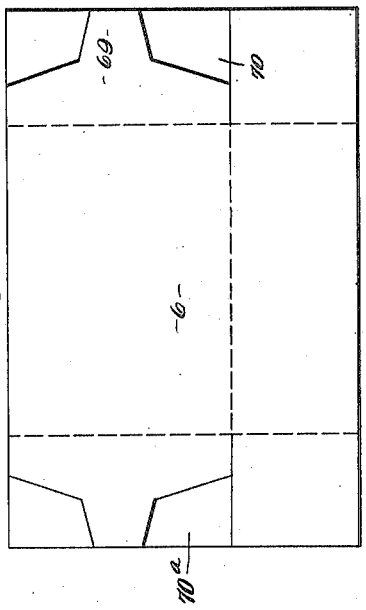
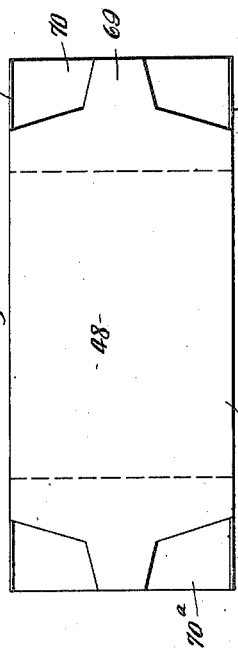
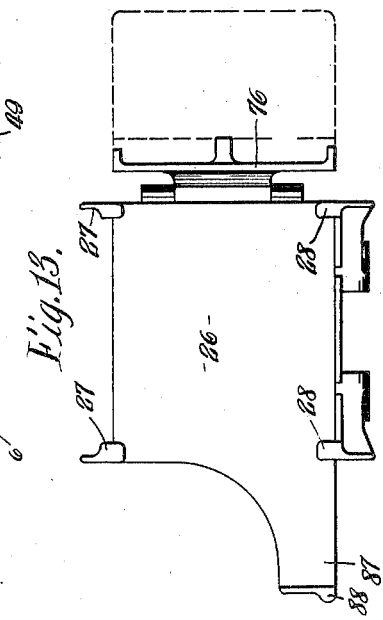
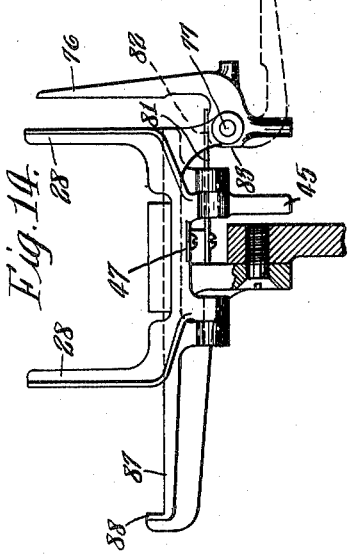
WITNESSES:
Chas H Young
Y. B. Pickard
INVENTOR.
Clarence H. Russell.
BY Parsons & Bodell
ATTORNEYS.

UNITED STATES PATENT OFFICE.

CLARENCE H. RUSSELL, OF SYRACUSE, NEW YORK.

CARTON-FORMING MACHINE.

1,275,759.  Specification of Letters Patent.  Patented Aug. 13, 1918.

Application filed April 12, 1915. Serial No. 20,809.

*To all whom it may concern:*

Be it known that I, CLARENCE H. RUSSELL, a citizen of the United States, and a resident of Syracuse, in the county of Onondaga and State of New York, have invented a certain new and useful Carton-Forming Machine, of which the following is a specification.

This invention has for its object the production of a machine for forming cartons from the forms, which are made from a scored and folded blank, which machine opens the flat folded form and folds and seals the flaps at the bottom end thereof; and the invention consists in the novel features and in the combinations and constructions hereinafter set forth and claimed.

In describing this invention, reference is had to the accompanying drawings, in which like characters designate corresponding parts in all the views.

Fig. 3 is an enlarged fragmentary view of the upper portion of the machine showing the feeding mechanism associated with the magazine, and also showing the upper portion of the carrier and contiguous parts.

Fig. 4 is a detail fragmentary view looking to the right in the upper portion of Fig. 3, and showing in elevation the means for starting the opening of the flattened carton form when in its first position on the carrier.

Fig. 5 is a section on line 5—5, Fig. 4.

Figs. 6 and 7 are fragmentary views illustrating in side elevation the operation of the mechanism shown in Fig. 4, and also the operations of the shaping mechanism operating on the carton form when in the receiver or holder occupying the first position on the carrier.

Fig. 8 is a fragmentary view showing in detail the operation of the stationary and movable folders which fold opposing end flaps when a receiver is in second position.

Fig. 9 is a sectional view taken on the plane of line 9—9, Fig. 8, contiguous parts being also shown.

Fig. 10 is a fragmentary view illustrating the gluing and fourth folding operation.

Fig. 11 is an enlarged detail fragmentary view of the feeding mechanism shown near the bottom of Fig. 1.

Fig. 12 is a section on the plane of line 12—12, Fig. 11.

Figs. 13, 14 and 15 are, respectively, a plan, a side elevation and an end elevation of one of the receivers.

Fig. 16 is a detail view illustrating the operation of one of the movable sides of a receiver.

Figs. 17 and 18 are detail views, respectively, of the flat carton form and the opened carton before the end flaps have been folded.

Figure 1:
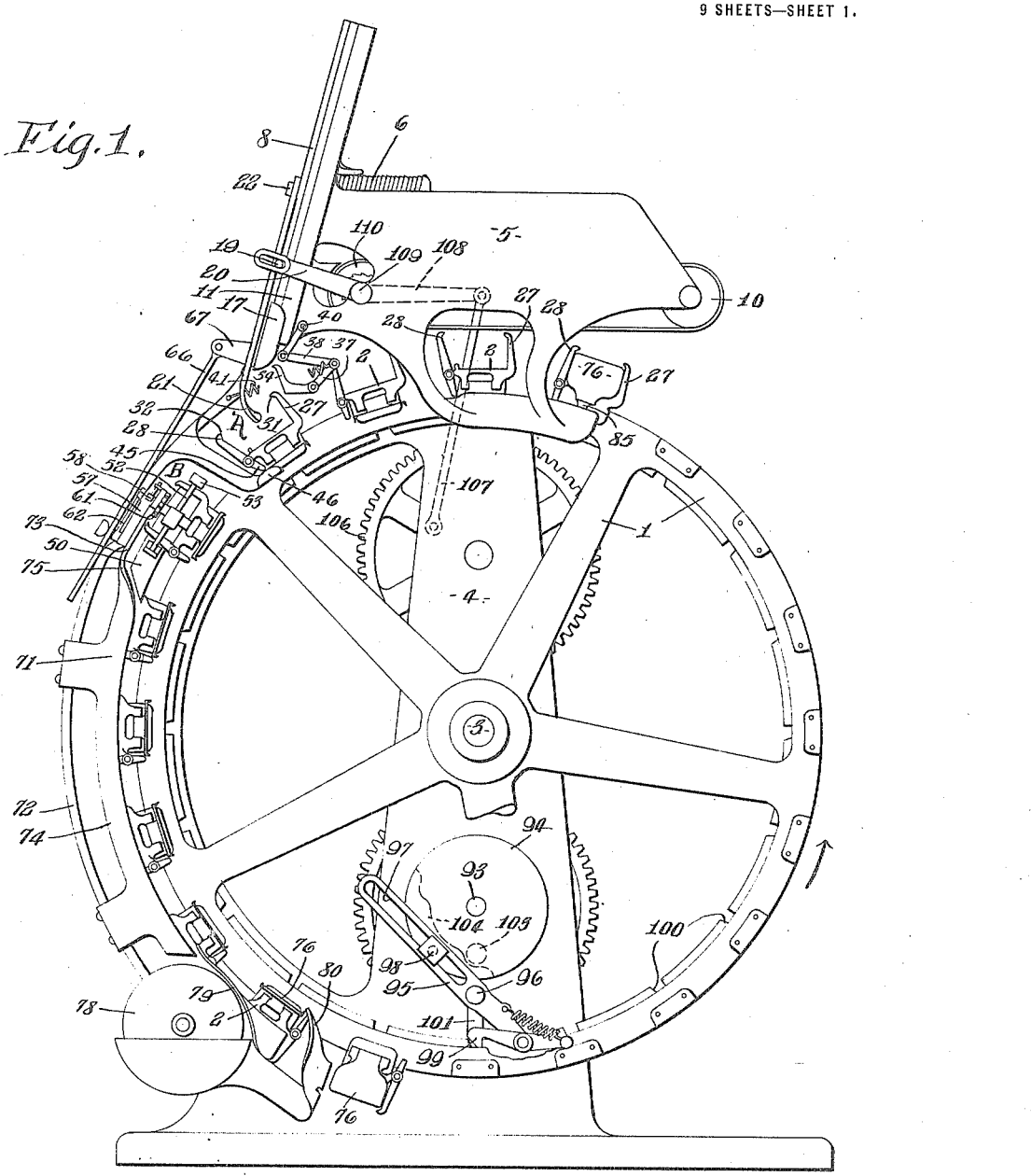
Figure 1 is a side elevation of one embodiment of my invention.

As will be understood by those skilled in the art, cartons are furnished in the folded forms with their end flaps in line with the side walls thereof, as seen in Fig. 17, and before the cartons can be filled, these flat carton forms must be opened into rectangular form, as seen in Fig. 18, and the flaps at the bottom ends folded inwardly and secured.

This invention comprises a machine for opening the flattened carton form and for finishing the cartons by folding and sealing the bottom end flaps so that the carton can be filled or fed to the filling machine with one end open.

The machine includes, generally, a movable carrier having means as receivers or holders for the flattened folded carton forms, means for feeding the flat carton forms one by one to the receivers or holders, means for starting the opening of the carton forms when in the receiver in what for convenience is termed the first position, means for completing the opening of the carton form and shaping the same with its end flaps projecting from the sides of the carton forms, means for folding and sealing the end flaps when the receiver or holder occupies successive positions, and means for actuating the carrier or feeding means and other movable parts of the machine.

The carrier may be of any desirable form, size and construction, and is here shown as a rotatable wheel 1 carrying a plurality of successively arranged receivers or holders 2 on its periphery, the carrier being mounted upon a shaft 3 journaled in a supporting frame 4, which frame is of any desirable form, size and construction. The carrier 1 is intermittently actuated in the direction of the arrow, Fig. 1, as will be hereinafter described.

The means for feeding the flat folded carton forms includes a magazine 5 in which the flattened cartons 6 are located in bulk, means as a follower 7 for pressing against the flat carton forms 6 and moving them toward the exit end of the magazine 5, and a feeding part or member 8 for delivering the cartons one by one to the receivers or holders 2. The magazine 5 and the feeding member 8 are preferably arranged to deliver the carton forms 6 in a tangential direction into the receiver in the first position indicated at A, Figs. 1, 3, 6 and 7. The follower 7 is guided between the walls of the magazine 5 and may be actuated in any suitable manner, and as here shown it is actuated by means of a friction belt 9, Fig. 3, located below the magazine and movable over pulleys 10 suitably supported by a bracket 11 forming part of the frame, one of these pulleys being connected to the actuating means, as hereinafter described.

The feeding member or part 8 which delivers the flat carton forms one by one from the magazine comprises a reciprocating slide movable in an inclined direction across the mouth or discharge end of the magazine and having a recess or pocket 12 therein of sufficient depth to receive one flat carton form 6, the slide being movable downwardly to discharge the carton form into the receiver or holder 2 in the first position A. The slide 8 reciprocates and as it approaches the limit of its upward movement, receives a flat carton form 6 and during its downward movement delivers the same into the receiver 2 in the first position A.

The slide 8 is guided in any suitable manner and as here shown, Figs. 1, 3, 4 and 5, it slides on the front ends of the magazine 5 and the bracket 11 in a guide 13, having ribs or flanges 14, see Fig. 5, secured by screws 15 to the front end walls 5ª, of the magazine 5, which flanges enter grooves 8ª in the slide. The slide 8 is also formed with laterally extending arms or brackets 17 near its lower end which extend over the guide 13 and embrace the edges of the walls 5ª.

The slide 8 is formed with laterally extending trunnions or pins 19 with which coact oscillating levers 20, Figs. 1, 3, 4, 5, 6 and 7, the levers 20 being connected to the actuating means as hereinafter described.

The means for starting the opening of the cartons in the receiver 2 in the first position A is movable in an endwise direction relatively to the flat carton forms in the receiver 2 in the first position, said means being movable between the opposing walls of the flat carton form to slightly separate the same.

In this embodiment of my invention, the separating means moves into opposite ends of the flattened carton and includes a pair of members 21, Figs. 1, 3, 4, 5, 6 and 7, arranged to move in directions at an incline to the plane of the flat carton form in the receiver 2 in first position A, the members being here shown as levers, Fig. 4, pivoted at 22 on inclined axes to the guide 13 for the slide 8, the levers extending parallel to each other and having inwardly curved fingers 23 which enter between the opposing walls of the flat carton form to separate the same. As here illustrated, the levers or separating members 21 are actuated at the proper time by the slide 8 which is formed with pins 24 movable in cam slots 25 extending lengthwise of the separating levers 21, see Fig. 4.

When the slide 8 is on its upward movement in position to receive another carton form from the magazine, the levers are operated to move the fingers inwardly as shown in Figs. 4 and 6, and hence separate the walls of the flat carton form and open the carton into the form of a flat oblique quadrilateral or rhomboid, as seen in Fig. 6. Of course, these levers also operate during the downward movement of the slide but such operation is ineffective, as there is no carton in the receiver 2 in first position.

The means for completing the shaping or opening of the cartons operates to apply pressure obliquely along the long diagonal of the flattened quadrilateral figure into which the carton form is opened by the starting or separating levers 21, the means by which the pressure is so applied acting in conjunction with the receiver to shape the carton to the form of the receiver.

Each receiver or holder 2 confines a quadrangular space and includes a bottom 26, and opposite side members 27, 28, the side members 27 and 28 being skeleton in form and the side member 27 being stationary and arranged at a right angle to the bottom 26 and including arms located at each end of the bottom, and the side member 28 being hinged at 29 to the bottom, or to the bracket 30, and normally standing at an obtuse angle to the bottom. The side members 27, 28 are also provided with suitable hook-shaped ends 31, 32 which hold the opened carton, as seen in Figs. 7 and 15. Each receiver or holder is also formed with an abutment 33 located at the angle or near the angle of the bottom 26 and the movable side member 28.

Figure 2:
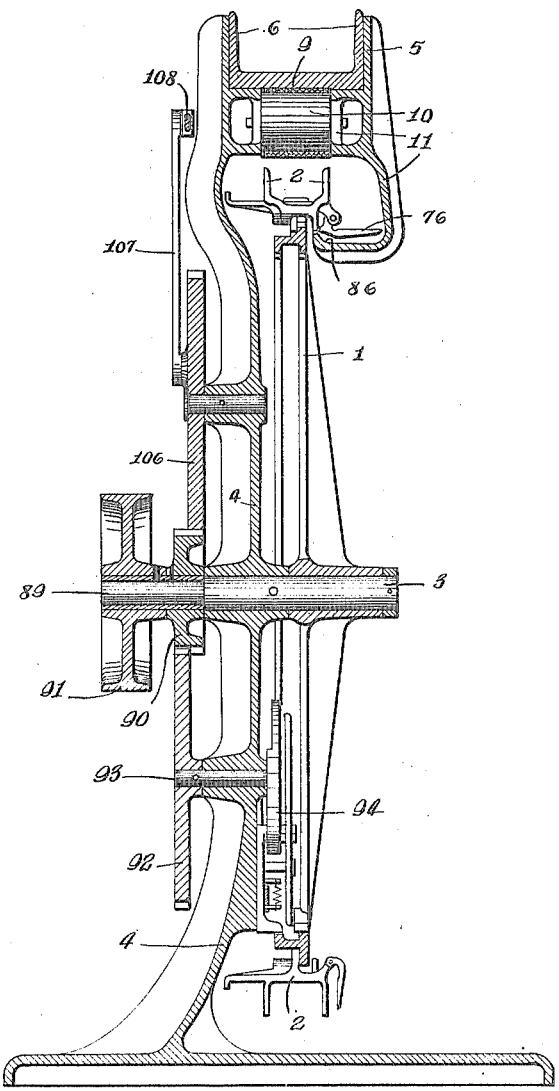
Fig. 2 is a vertical sectional view taken centrally of Fig. 1, parts being omitted.

When the receivers or holders are in their first position, the flat carton form is delivered thereto in a substantially tangential direction relatively to the carrier, the advanced side edge of the carton form engaging the abutment 33, which is in line with the path of the carton form, and the carton form extends obliquely across the space inclosed by the receiver and rests on the upper edge of the stationary side member 27 which side member is located nearest the slide 8, the side margin of the carton form opposite the edge on the abutment, extending beyond the side member 27. When the carton form is in this position the separating members or levers 21 perform their function to start the opening of the carton, as seen in Fig. 2.

The means for completing the opening of the carton form applies pressure against the edge of the margin projecting beyond the stationary side member 27 and along the long diagonal of the carton form toward the abutment 33. Said means operates to open the carton form into and beyond a figure rectangular in cross-section and into a quadrilateral or rhomboid figure, as seen in Fig. 7, this rhomboid form being permitted by reason of the fact that the movable side member 28 is standing at an oblique angle to the bottom 26 of the receiver or holder. The distorting of the carton form beyond its final rectangular position is to break the scoring at the corners of the carton so that the carton will not spring back beyond a rectangular form toward its original flat form.

The means for completing the opening of the carton, in this embodiment of my invention, comprises a lever 34 pivoted at 35 to a bracket 36 depending from the bracket 11 supporting the magazine 5, the lever 34 having an arm 37 projecting beyond its pivot which is connected to one end of a link 38 pivoted at its other end to a link 39, which in turn is pivoted at 40 to the bracket 11. The levers and links normally stand in the position shown in Figs. 1, 3 and 6, and are operated by a spring 41 connected to the joint 42 between the lever arm 37 and the link 38, the spring being connected at its other end to a fixed point so that it normally tends to straighten the lever or arm 37 and link 38 toward a dead center line into the position shown in Fig. 7.

The operation of the lever 34 is controlled and normally restrained by the slide 8, as the knuckle or joint 43 connecting the link 38 to the link 39 moves into the path of the slide 8 and is normally pushed out of and held out of said path of the slide by the advance end of the slide, which is formed with a cam surface 44 for engaging the knuckle or joint.

As best seen in Figs. 6 and 7, after the flat carton form has been slightly opened by the separators 21 or their fingers 23, the slide 8 recedes upwardly toward its starting position to receive another carton, and during this movement it passes out of engagement with the knuckle 43 permitting the spring 41 to actuate the lever 34 and shape the carton into the position shown in Fig. 7. The carrier 1 is now actuated one step to carry the carton or the receiver in which it is held, into the second position B, and during this movement of the carrier the movable side member 28 is moved by its spring 47 into an upright position thus squaring the carton. This movable side 28 is here shown as provided with an arm 45 normally engaged with the stationary cam 46 on the frame and during the movement of the carrier, said arm 45 passes out of engagement with said cam 46 permitting a spring 47, Fig. 16, which acts on the side member 28, to press said member into upright position.

The spring 47 acts to move the movable side 28 as the receiver is moving from first position A to second position B, Fig. 1, and the squared carton form is held with the flaps projecting in line with the sides thereof. There are flaps projecting from both ends of the carton, but those at the bottom end only are folded and sealed.

When the carrier is moving and the squared carton 48 is being carried from the first position A, to the second position B, one of the flaps 49 projecting from the advance side thereof is engaged by a stationary folder 50, Figs. 1, 8 and 9, which irons over the flap 49. The flap 51 opposed to the flap 49 is next engaged after the carrier comes to a stop, by a movable folder here shown as a wheel 52 movable about an axis arranged radially relatively to the axis of the carrier and rotatable so that the side nearest the carrier moves in the direction of the carrier. The wheel 52 consists of radially extending arms or spokes carrying segments 53 of the rim at their ends, which segments act as shoes to iron or fold over the flap 51. In this form of my machine, the stationary folder 50 is formed with a laterally turned end 54 and is also formed with a slot which extends into said laterally turned end and through which slot 55, pass the arms or spokes with their shoes 53 at their ends, Figs. 8 and 9.

The wheel 52 is mounted on a suitable shaft 56 journaled in bearings supported by a bracket 57 supported by the main frame, and said wheel is rotated by any suitable means here shown as a reciprocating slide 58 which actuates an arm pivoted to the shaft 56, said arm carrying a pawl 59 which is pivoted at 60 to said arm, see Fig. 8, the pawl coacting with a ratchet wheel 61 mounted on the shaft 56. The slide 58 is actuated with the slide 8 and is connected thereto by means of a bell crank lever 62 pivoted at 62ª to a portion of the frame, one arm of the bell crank lever being connected by a pin-and-slot connection to the slide 58, and the other arm 63 thereof being connected by a pin-and-slot 64, 65 to a link 66 connected to the arm 67 rigid with the slide 8. Thus, when the slide 8 operates, the wheel 52 will be turned, and the extent of the movement, and the time thereof, is controlled by the pin-and-slot connection 64, 65. Thus by regulating the pin-and-slot connection 64, 65, the pawl 59 may move over two teeth of the ratchet 61 at one stroke and thus complete a revolution of the ratchet wheel in four strokes.

The flaps 49, 51, on the narrow sides of the carton having been folded, the other flaps 69, 70, on the wider sides of the carton are next folded. The flap 69 is folded by means of a stationary cam 71, Fig. 1, suitably supported by a part 72 connected to the frame, this cam 71 including portions 73, 74 arranged in planes at right angles to each other, which portions are connected by a twisted or turning portion 75 which serves to bend over the flap from its normal position into its closed position.

The flap 70 normally overlies a folding leaf 76 pivoted at 77 at one end of the receiver and movable on its pivot from its open to its closed position to fold the flap 70. Prior to this folding operation, however, the flap 70 is carried during the rotation of the carrier 1 against an adhesive applying roller 78, it being guided against the roller by means of a stationary guide or deflector 79, Fig. 10, which wipes the flap 70 against the roller 78.

During the next forward feeding of the carrier 1, the flap 70 with the adhesive is pressed against the flap 69 by means of the cam 79, and subsequently this flap 70 is held in its closed position until the adhesive dries, by means of the leaf 76 which is folded by the cam 80 in position to press against the leaf 70, see Fig. 10. The leaf is held in either its open or closed position by means of a spring 81, Fig. 14, engaging one or the other of surfaces 82, 83 arranged at a right angle to each other.

During the folding operations, the carrier moves through less than one half of its cycle of movement, and the leaf 76 is held in its closed position while the carrier is making substantially one-half revolution so that ample time is given for the adhesive to dry, and after the adhesive is dry and the carrier is completing its cycle, the arm 45 of the side 28 of the first receiver engages a stationary cam 84 carried by the bracket 11 which cam opens the first receiver 4 so that the carton can be delivered therefrom, and also the arm 85 of the leaf 76 engages a cam surface 86, Fig. 2, which opens said leaf.

During the movement of the carrier, the flap 70ª on the top of the carton rests upon an extension 87 of the bottom 26 of the holder or receiver, which extension is provided with a suitable abutment 88 at its end, Figs. 13 and 14, to prevent displacement of the carton.

The carrier feeding means and movable parts of the folding means are actuated in any suitable manner, and as here shown, the actuating means includes a driving shaft 89, Fig. 2, supported by the frame in alinement with the shaft 3 on which the carrier is mounted, a gear 90 mounted on said shaft, and power transmitting connections operated by the gear. A suitable driving pulley 91 is mounted upon the shaft 89.

The power transmitting connections between the gear 90 and the carrier to intermittently actuate the same, as here illustrated, includes a gear 92 meshing with the gear 90, a shaft 93 upon which the gear 92 is mounted, a rotating disk 94, Figs. 1, 2, 11 and 12, mounted on said shaft, an oscillating lever 95 pivoted at 96 to a fixed point on the frame, the lever having a lengthwise slot 97 in one arm thereof which receives an eccentric pin 98 on the disk 94 and a pawl 99 connected to the other arm of the lever and coacting with internal teeth 100 on the carrier 1.

Obviously, as the disk 94 rotates, an oscillating movement will be given to the lever which will cause the pawl to ratchet backwardly during one movement of the lever and to take into the internal teeth 100 during the opposite movement of the lever, thus actuating the carrier forwardly a single step.

The carrier is locked during the intermittent stoppings thereof by any suitable means here shown as a sliding bolt 101, Figs. 1 and 11, having a slot 102 on the pivot 96 of the lever 95, the bolt being movable vertically and having a tooth at its lower end for coacting with the teeth 100, and having a roller 103 at its upper end coacting with the cam 104 on the inner face of the disk 94. The movement of the bolt by the cam is against the action of a downward pulling spring 105. The cam 104 is arranged to withdraw the bolt just prior to the time the pawl 99 commences its forward movement.

The power transmitting connections between the gear 90, here illustrated, and the feeding means comprises a gear 106, Figs. 1, 2, meshing with the gear 90, a link 107 connected at one end to the gear eccentrically thereof, and at its other end to a rock arm 108 mounted on the shaft 109 on which the lever arms 20, which actuate the slide 8, are mounted. One of the pulleys 10 over which the belt 9 runs is also mounted on this shaft 109, and is connected thereto by a ratchet wheel 110 and pawl 111 by which the pulley 10 is turned and the belt actuated when the carton forms are being fed.

In operation, the flattened cartons are placed in the magazine 5 and the machine started in any suitable manner, whereupon the slide 8 first moves upwardly from the position shown in Fig. 1 to receive a carton form from the magazine, then downwardly to carry a flat carton form into the receiver or holder 2 in the first starting position A. The carrier is then at a standstill and the opening of the carton by the separating members 21 and the opening thereof by the lever 34 is effected. The carrier is then again actuated in a forward direction causing the receiver with the carton therein to move into position B, Fig. 2, and during its passage from position A, to position B, the hinged side member 28 moves free of the cam 46 so that said side 28 moves into upward position and squares the carton. While this operation is taking place, another receiver is moving into position A and another carton being fed therein.

The folding of the opposing end flaps on the narrow sides of the carton is then effected by the stationary and movable cams 50, 52, respectively, whereupon the third forward movement of the carrier takes place causing the flap on the upper wider side of the carton to be folded by the cam 71. However, this folding operation is not completed until the carrier takes four steps in advance at which point the fourth flap engages the deflector 79 which guides it against the adhesive applying roller 78.

During the next advance step, the leaf 76 engages the cam 80 which folds said leaf into position. At this point, the carrier has made less than one-half a revolution. During the next half revolution of the carrier, the leaf remains closed holding the flaps down until the adhesive dries, when the first carrier moves into coaction with the cams 84, 86, to release the finshed box or carton, which is delivered to a suitable conveyer which carries it to the machine for filling the cartons.

What I claim is:—

1. A carton forming machine comprising a carriage having a receiver for the flat folded carton form, separating means movable between opposing walls of the flat carton when on the receiver, said means being movable at an angle to the plane of the flat carton and toward the receiver, substantially as and for the purpose described.

2. A carton forming machine comprising a carriage having a receiver for the flat folded carton form, separating means movable into opposite ends of the receiver between opposing walls of the flat carton when on the receiver, said means being movable at an angle to the plane of the flat carton and toward the receiver, substantially as and for the purpose specified.

3. A carton forming machine comprising a carrier having a receiver for the flat, folded carton form, separating means movable between opposite walls of the flat carton form for starting the opening thereof, said means including a pair of pivoted members having portions movable toward and from each other into opposite ends of the carton form, to separate the opposing walls thereof, and means for completing the opening of the carton form, substantially as and for the purpose specified.

4. A carton forming machine comprising a carrier having a receiver for the flat, folded carton form, a pair of separating members movable between the opposing walls of the flat carton form, said separating members being movable on pivots arranged at inclined angles to the plane of the flat carton form, whereby the separating members move into opposite ends of the carton form at an inclined angle to the plane thereof, and means for completing the opening of the carton form, substantially as and for the purpose set forth.

5. A carton forming machine comprising a carrier having a receiver for the flat, folded carton form, means movable between opposite walls of the flat carton form for starting the opening thereof, said means including substantially parallel levers having fingers at their ends extending toward each other and movable into opposite ends of the carton form, the axes of the levers being at inclined angles to the plane of the carton form, and means for completing the opening of the carton form after the opening has been started by the fingers, substantially as and for the purpose described.

6. A carton forming machine comprising a carrier having a receiver for the flat folded carton form, means for feeding the carton form to the receiver including the movable member, separating means movable between opposite walls of the flat carton form on the receiver to start the opening of the carton form, power transmitting connections operated by said movable member of the feeding means and connected to the separating means whereby the separating means is operated from the feeding member.

7. A carton forming machine comprising a carrier having a receiver for the flat, folded carton form, means for feeding the carton form to the receiver including a reciprocating part, pivoted separating means extending in the same general direction as the movement of the reciprocating part and being arranged contiguous to said part, the separating means having portions thereof movable between opposing walls of the flat carton form in the receiver, connections between the reciprocating part and the separating means, and means for completing the opening of the carton, substantially as and for the purpose described.

8. A carton forming machine comprising a carrier having a receiver for the flat, folded carton form, means for feeding the carton form into the receiver including a guide, a reciprocating part movable along the guide, separating means mounted on the outside of the guide and having portions movable between opposite walls of the carton form in the receiver for starting the opening of the carton form, means for actuating the reciprocating part, connections between said part and the separating means, and means for completing the opening of the carton, substantially as and for the purpose specified.

9. A carton forming machine comprising a carrier having a receiver for the flat, folded carton form, the receiver having a fixed abutment against which one corner edge of the flat carton form abuts, and means external to the carrier for pressing the diagonally opposite edge of the carton form toward the abutment for opening the carton, substantially as and for the purpose described.

10. A carton forming machine comprising a carrier having a receiver for the flat, folded carton form, the receiver confining a quadrangular space and having side and bottom members and also an abutment near one inner bottom corner of the receiver, the flat carton form normally resting with one side edge against the abutment and with the margin opposite said edge resting on the upper edge of one side member and projecting beyond said side member, and means for engaging the edge of said projecting margin and applying pressure obliquely to the carton form for opening the same, substantially as and for the purpose specified.

11. A carton forming machine comprising a carrier having a receiver for the flat, folded carton form, means for applying pressure to opposite edges of the carton form to open the carton form into and beyond a figure rectangular in cross-section and into a rhomboid or oblique quadrangular figure, and means for pressing said rhomboid or oblique quadrangular figure back into rectangular form, substantially as and for the purpose described.

12. A carton forming machine comprising a carrier having a receiver for the flat, folded carton form, the receiver confining a quadrangular space and having opposing side members, and a bottom, one side member being movable from a right angular relation to the bottom to an inclined position and being normally arranged in the inclined position, and being movable into a position at a right angle to said bottom, means for opening the carton form in the receiver into and beyond a figure rectangular in cross-section with one side thereof against the inclined side member of the receiver, and means for moving said inclined side member into a vertical position and thereby squaring the carton form in the receiver against the opposite side members and the bottom of the receiver, substantially as and for the purpose specified.

13. A carton forming machine comprising a carrier having a receiver for the flat, folded carton form, the receiver confining a rectangular space and having opposing side members and a bottom, one of the opposing side members being hinged and movable from a position at a right angle to the bottom into a position at an obtuse angle thereto and being normally arranged in its inclined position, the receiver also having an abutment near the bottom thereof adjacent the hinged side member against which abutment one edge of the carton form rests with its opposite margin on the upper edge of the opposite side member, means for opening the carton form including a movable part bearing against the edge of said margin and opening the carton form into and beyond a figure rectangular in cross-section, and means for moving the movable side member of the receiver into its right angular relation to the bottom for squaring the carton form to fit the receiver, substantially as and for the purpose set forth.

14. A carton forming machine comprising a carrier having a receiver for the flat, folded carton form, the receiver confining a quadrangular space and having a bottom and side members, and also an abutment near one inner bottom corner of the receiver, separating means movable between opposing walls of the flat carton form resting with one edge against the abutment and its opposite margin on the edge of the opposite side member, for starting the opening of the carton form, and means for pressing on the edge of said margin of the partly open carton form toward the abutment, to fit the same within the receiver, substantially as and for the purpose specified.

15. A carton forming machine comprising a carrier having a receiver for the flat, folded carton form, the receiver having a bottom and side members, one of the side members being pivoted and normally standing at an obtuse angle to the bottom and being movable into a right angular relation to the bottom, the receiver also having an abutment located in the angle of the movable side member and the bottom, against which abutment one edge of the flat carton form rests with the opposite margin thereof resting on the upper edge of the opposite side member of the receiver, means movable in an endwise direction relatively to the carton form between opposing walls of the carton form for starting the opening of the carton form, means for applying pressure along the long diagonal of the partly opened carton form on the edge of said margin to open the carton form into and beyond a figure rectangular in cross-section and into an oblique quadrangular figure, and means for moving said movable side of the receiver into right angular position to square the open carton form within the receiver, substantially as and for the purpose set forth.

16. A carton forming machine comprising a carrier having a receiver for the flat, folded carton form, means for feeding the carton form to the receiver, and means for opening the carton form in the receiver, the last-mentioned means being controlled in its operation by the feeding means, substantially as and for the purpose described.

17. A forming machine comprising a carrier having a receiver for the flat, folded carton form, means for feeding the carton form to the receiver including a reciprocating member, and means for applying pressure to one edge of the carton form in the receiver for opening the carton form, the last-mentioned means being controlled in its operation by said reciprocating part, substantially as and for the purpose specified.

18. A forming machine comprising a carrier having a receiver for the flat, folded carton form, means for feeding the carton form to the receiver including a reciprocating member, and means for applying pressure to one edge of the carton form in the receiver for opening the carton form, the last-mentioned means including a part movable into the path of the reciprocating member, and being normally out of said path by said member, and a spring normally tending to actuate the pressure applying means, substantially as and for the purpose described.

19. A carton forming machine comprising a carrier having a receiver for the flat, folded carton form, means for feeding the carton form to the receiver including a movable part, and means for opening the carton form in the receiver including a lever arranged to press on one edge of the flat carton form and apply pressure obliquely to the carton form, toggle links, one of which is connected to said lever, the joint of the links being movable into the path of said reciprocating member and normally held out of said path by the reciprocating member, and a spring normally acting on the toggle links in a direction to operate the lever and move the joint into the path of the reciprocating member, substantially as and for the purpose specified.

20. A carton forming machine comprising a carrier having a receiver for the flat, folded carton form, means for feeding the carton form to the receiver including a movable member, separating means movable between opposite walls of the flat carton form for starting the opening of the carton form, means for completing the opening operation of the carton form, connections between said movable member and the separating means to operate the separating means, and mechanism controlled by said movable member for operating the means which completes the opening of the carton form, substantially as and for the purpose set forth.

21. A carton forming machine comprising a carrier having a receiver for the flat, folded carton form, means for feeding the carton form to the receiver including a movable part, and means for opening the carton form in the receiver including a member arranged to press on one edge of the flattened carton form, and a series of links connected to said member, the joint connecting the links forming an elbow movable into the path of said movable part and being movable out of said path by the movable part, substantially as and for the purpose specified.

22. A carton forming machine comprising a carrier having a receiver for the flat, folded carton form, means for feeding the carton form to the receiver including a movable part, and means for opening the carton form in the receiver including a member arranged to press on one edge of the flattened carton form, a series of links connected to said member, the joint connecting the links forming an elbow movable into the path of said movable part and being movable out of said path by the movable part, and a spring acting on the links and tending to move the pressure applying member into operative position and also move the joint into the path of said movable part, substantially as and for the purpose set forth.

23. A carton forming machine comprising an intermittently rotatable carrier having receivers on its periphery for flattened carton forms, means for feeding the carton forms one by one from the magazine tangentially relatively to the carrier into the receivers as the receivers move into tangential relation to the feeding means, and means for opening and shaping the flattened carton forms when in the receiver, substantially as and for the purpose set forth.

In testimony whereof, I have hereunto signed my name in the presence of two attesting witnesses, at Syracuse, in the county of Onondaga, and State of New York, this 23d day of February, 1915.

CLARENCE H. RUSSELL.

Witnesses:
J. H. Glazier,
T. B. Pickard.